(12) United States Patent
Macchia et al.

(10) Patent No.: US 9,215,453 B2
(45) Date of Patent: Dec. 15, 2015

(54) METHOD FOR CALIBRATING A MEASUREMENT SYSTEM AND DEVICE FOR CARRYING OUT THE METHOD

(75) Inventors: Adriano Macchia, Munich (DE); Volker Uffenkamp, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 382 days.

(21) Appl. No.: 13/816,603

(22) PCT Filed: Jul. 18, 2011

(86) PCT No.: PCT/EP2011/062273
§ 371 (c)(1),
(2), (4) Date: Feb. 12, 2013

(87) PCT Pub. No.: WO2012/019877
PCT Pub. Date: Feb. 16, 2012

(65) Prior Publication Data
US 2013/0141545 A1    Jun. 6, 2013

(30) Foreign Application Priority Data
Aug. 12, 2010 (DE) .......................... 10 2010 039 246

(51) Int. Cl.
*H04N 17/02* (2006.01)
*H04N 17/00* (2006.01)
(Continued)

(52) U.S. Cl.
CPC ............ *H04N 17/002* (2013.01); *G01B 11/245* (2013.01); *G01B 11/2504* (2013.01);
(Continued)

(58) Field of Classification Search
CPC ..... H04N 17/002; H04N 17/00; H04N 17/02; G01B 11/245; G01B 11/2504; G01B 11/275; G01B 21/042; G01C 11/00; G06T 7/002; G06T 2207/20076; G06T 2207/30108; G06T 2207/30208

USPC ............................................ 348/135, 47, 142
See application file for complete search history.

(56) References Cited

U.S. PATENT DOCUMENTS 5,612,905 A    3/1997 Maillart et al.
5,768,443 A *  6/1998 Michael et al. ............... 382/294
(Continued)

FOREIGN PATENT DOCUMENTS

DE    102008042024    3/2010
EP    1091186    4/2001
(Continued)

OTHER PUBLICATIONS

International Search Report for Application No. PCT/EP2011/062273 dated Oct. 28, 2011 (2 pages).

*Primary Examiner* — Trang U Tran
(74) *Attorney, Agent, or Firm* — Michael Best & Friedrich LLP

(57) ABSTRACT

The invention relates to a method for calibrating a measurement system having at least one image recording apparatus (12) having at least two measurement cameras (31, 32) that form a stereo camera system, and having an analysis unit (13), wherein the measurement system is calibrated by means of a calibration device (22) having reference features (29). The process flow of the method is divided into three steps, wherein in a first step the 3D coordinates of the reference features (29) are determined in a measurement space (30) of the calibration device (22) by at least one image recording camera (9), and in a second step at least one of the image recording apparatuses (12) is disposed in the measurement space (30) of the calibration device (22), and in a third step the 3D coordinates of the at least one image recording apparatus (12) and/or of the at least two measurement cameras (31, 32) are determined in a common 3D coordinate system by means of the analysis unit (13) using the 3D coordinates determined in the first step. The calibration device (22) comprises a measurement space (30) for receiving the image recording apparatus (12) and said measurement space is at least partially bounded by a measurement frame (22) having the reference features (29).

13 Claims, 3 Drawing Sheets

(51) Int. Cl.
*G01B 11/245* (2006.01)
*G01B 11/25* (2006.01)
*G01B 11/275* (2006.01)
*G01B 21/04* (2006.01)
*G01C 11/00* (2006.01)
*G06T 7/00* (2006.01)

(52) U.S. Cl.
CPC ............ *G01B11/275* (2013.01); *G01B 21/042* (2013.01); *G01C 11/00* (2013.01); *G06T 7/002* (2013.01); *G06T 2207/20076* (2013.01); *G06T 2207/30108* (2013.01); *G06T 2207/30208* (2013.01)

(56) References Cited

U.S. PATENT DOCUMENTS

| | | | |
|---|---|---|---|
| 7,138,645 | B2 | 11/2006 | Arai et al. |
| 7,286,698 | B2 * | 10/2007 | Arai et al. ..................... 382/154 |
| 8,666,142 | B2 * | 3/2014 | Shkolnik et al. .............. 382/154 |
| 2006/0152711 | A1 | 7/2006 | Dale et al. |

FOREIGN PATENT DOCUMENTS

| | | |
|---|---|---|
| EP | 1376051 | 1/2008 |
| FR | 2921478 | 3/2009 |

* cited by examiner

METHOD FOR CALIBRATING A MEASUREMENT SYSTEM AND DEVICE FOR CARRYING OUT THE METHOD

BACKGROUND OF THE INVENTION

The American patent application US 2006/0152711 A1 discloses a method and a device for optical chassis measurement in motor vehicles having four measuring devices, which record objects to be measured on the motor vehicle from different perspectives. An attached analysis unit determines the spatial position of measuring points on the motor vehicle from the recorded images. In order to determine the measuring station coordinates, grid lines are provided on a contact area of the motor vehicle as reference features. In addition to the reference features, a mobile inspection feature arrangement having inspection features in the shape of a cube is present. The reference features and the inspection features are recorded by the measuring devices and used for calibrating the measuring station reference system.

The German patent application DE 10 2008 042 024 A1 discloses a method and a device for optical axle alignment in motor vehicles. In this case, measuring panels, which are mounted at the wheels and have optically recordable marks, are detected by two measuring units that each have two stereo camera arrangements. In a referencing procedure, a measuring station reference system is defined for the measuring units using a referencing device integrated into said measuring units. The calibration of the stereo camera systems to each other and the referencing device to the stereo systems is of great importance here.

SUMMARY OF THE INVENTION

The aim of the present invention is to create a method and a device for the simple calibration of a measuring system having stereo camera systems and/or referencing devices, which method can be easily implemented in the shop.

The aim of the invention is met by the distinguishing features of the independent claims. The method according to the invention for calibrating a measurement system and the device for carrying out the method, which device comprises the features of the independent claims, have the advantage that the method is easy to carry out and the device has a simple design. Said method can therefore be used in every shop which has a measuring system for axle alignment. The measuring system having stereo camera systems and/or referencing devices no longer has to be calibrated directly at the manufacturer or during manufacturing operations but can be calibrated directly on site. A replacement of cameras and the subsequent calibration can thereby be more quickly and easily carried out. Furthermore, the accuracy of the axle alignment can be easily checked on location.

It is expedient for the determined 3D coordinates of the reference features and the orientation parameters of the image recording camera to be jointly determined by means of an adjustment process known per se because said process draws on known and exact numerical methods. The 3D coordinates of the image recording position as well as the three rotations for describing the image recording direction are designated as orientation parameters.

A further advantage is the determination of the accuracy of the determined 3D coordinates of the reference features of the measurement frame in the form of standard deviations from the evaluation of the over-determined system so that the calibration of the measuring camera is only carried out if the 3D coordinates of the reference features were determined with a high degree of accuracy which is also sufficient for the calibration.

The relative and/or absolute calibration of the at least two measurement cameras is advantageous in the second step of the method. In so doing, the relative orientation of the measurement cameras of a stereo camera system to one another is established and the global orientation of the measurement cameras is defined in a global 3D coordinate system.

A further advantage results from the determination of all intrinsic or parts of the intrinsic parameters of at least one measuring camera because the inner parameters of the camera can be calibrated after a camera replacement.

It is advantageous for the at least one image recording camera to be realigned a plurality of times in the first step and for all reference features of the calibration device to be sequentially or continuously acquired from at least two image recording positions by changing the image recording direction. This facilitates the recording of a sufficient number of images having reference features, which partially overlap one another, in order thereby in a third step to completely solve a system of equations with unknowns which represent the reference features, camera positions and image recording positions in a common 3D coordinate system.

A particular advantage is the approximated specification of the image recording positions and the image recording directions of the at least one image recording camera by means of a positioning device. It is ensured by means of the positioning device that all reference features are completely recorded and a higher quality of the recordings is achieved when the image recording camera is sequentially or continuously recording the reference features. Blurred images and an insufficient overlap of the images can be prevented.

This advantage is further enhanced if the image recording positions and image recording directions of the positioning device are automatically specified by an analysis unit. This is the case because the image acquisition is accompanied by internal calculation algorithms and an advantageous image recording direction can be calculated for the next image acquisition.

A further advantage of the method is that all or individual measurement cameras of the image recording apparatus can be replaced and subsequently calibrated. This allows on site service in the event that cameras are defective. In order to maintain the global calibration, at least one measurement camera of the image recording apparatus must however remain unchanged.

When calibrating the referencing devices and/or at least one measurement camera, a further advantage becomes apparent because two image recording apparatuses can be placed into the measurement frame at the same time. As a result, no additional procedural steps arise when carrying out the method. The calibration of the referencing devices is performed at the same time as the calibration of the at least one measurement camera.

Because of the fact that the calibration device is constructed from at least three plates, a simple setup and dismantling of the calibration device is facilitated in the shop. In addition, the individual plates can be easily transported. The plates are rigidly connected to one another when the method is operating, and therefore the position of the reference features can not change with respect to one another. This is a requirement for a correct operation of the method.

The calibration device can be expediently put into use by at least one plate being used as the base plate which is perpendicular to two plates disposed oppositely to one another. In so doing, the image recording apparatus can be placed on the base plate and the two plates disposed oppositely to one another can be simultaneously brought into focus with the two stereo camera systems.

The use of natural and/or artificial marks as reference features on each plate is advantageous because this allows for a large number of different manufacturing materials and manufacturing methods to be used when manufacturing the plates with reference features.

By using retro-reflective and/or actively luminous reference features, the recording of the reference features is simplified when the lighting conditions are poor. Furthermore, the use of reference features having coding simplifies the subsequent evaluation by the analysis unit.

A special advantage results by connecting the plates on the edges thereof via plug connections and/or screw connections. Such connections provide a simple and reliable option of rigidly connecting the plates to one another, which connections cannot only be undone after carrying out the method but undone in a simple manner.

BRIEF DESCRIPTION OF THE DRAWINGS

An exemplary embodiment of the invention is depicted in the drawings and described in detail in the following description.

In the drawings.

DETAILED DESCRIPTION

Figure 1:
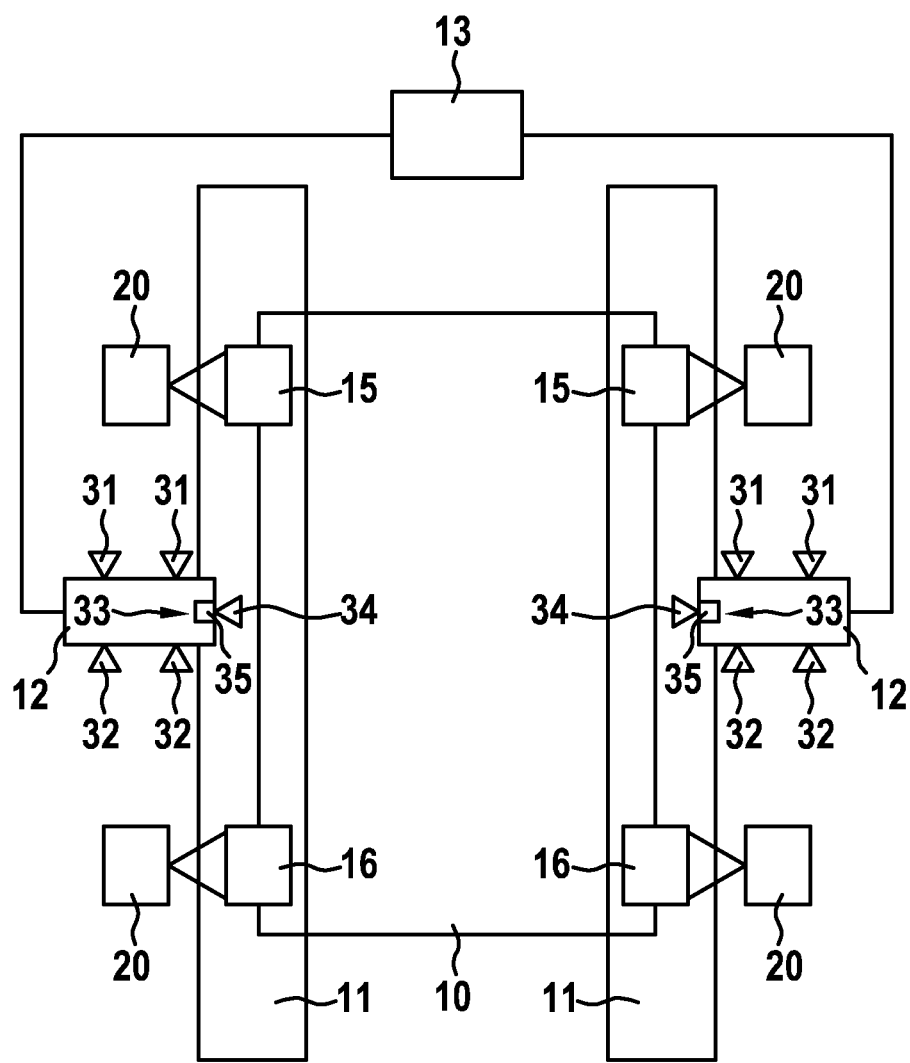
FIG. 1 shows a schematic depiction of a measuring station for the axle alignment of a motor vehicle comprising a measurement system.

FIG. 1 shows an axle alignment device with a measurement system and a motor vehicle 10 on a vehicle lift comprising two driving tracks 11. Measuring panels 20 protruding laterally into the room are attached in each case to both of the front wheels 15 and both of the rear wheels 16. The measuring panels 20 have a substantially flat surface, on which optically recordable markings are arranged.

The measurement system comprises two image recording apparatuses 12 having each four measurement cameras 31, 32 and having each a referencing device 33 and an analysis unit 13. The two image recording apparatuses 12 are in each case attached at the side of the two driving tracks 11 and are connected to the analysis unit 13, which contains an image processing software. The two image recording apparatuses 12 have in each case two stereo camera systems, which are formed by the respectively two measurement cameras 31, 32. The stereo camera system, which is directed towards the front and is formed by the two measurement cameras 31, records the measuring panels 20 disposed at the front wheels 15, and the stereo camera system, which is directed towards the rear and is formed by the two measurement cameras 32, records the measuring panels 20 disposed at the rear wheels 16.

Each image recording apparatus 12 further comprises the referencing device 33, which has a referencing camera 34 designed as a receiving unit and a LED 35 designed as a sending unit. The two image recording apparatuses 12 are aligned in the depicted measurement system such that the two referencing devices 33 face each other, and the LED 35 of the image recording apparatus 12 depicted on the right side of the illustration can be recorded by the referencing camera 34 of the image recording apparatus 12 depicted on the left side thereof. Analogously the LED 35 of the image recording apparatus 12 depicted on the left side of the illustration can be recorded by the referencing camera 34 of the image recording apparatus 12 depicted on the right side thereof.

A measuring station reference system for the image recording apparatuses 12 can be defined by means of the referencing process and is transmitted to the analysis unit 13. In so doing, an additional reference arrangement for defining a measuring station reference system is not necessary. The axle alignment device is not sensitive to changes in the position of the image recording device 12 during the measurement process. A referencing of the image recording device 12 is possible prior to and/or continuously during each measurement process.

Instead of a global analysis unit 13, each image recording apparatus 12 or each of the measurement cameras 31, 32 and each referencing camera 34 can also have its own computer and storage unit, which serves as an analysis unit 13 and is connected in each case to the other units.

Reference is made to the German patent application DE 10 2008 042 024 A1 with regard to the implementation of the method for axle alignment using the measurement system depicted.

The calibration of the measurement system using a calibration device 22 is explained below.

Figure 2:
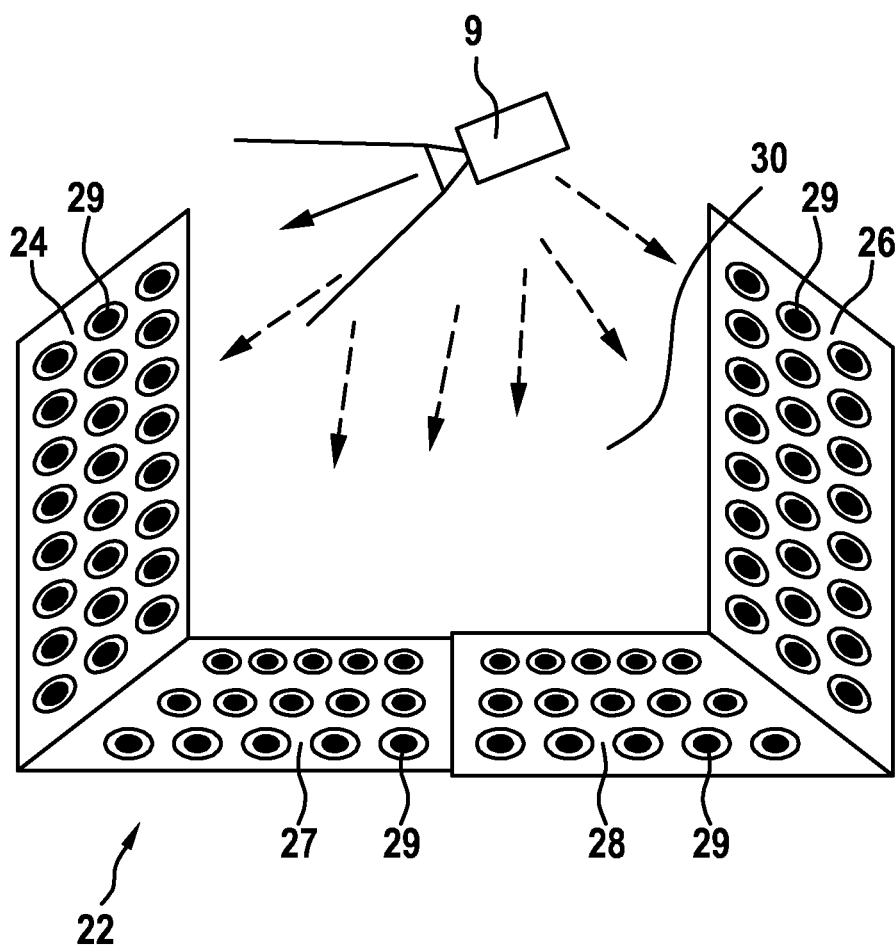
FIG. 2 shows a depiction of a calibration device.

Pursuant to FIG. 2, the calibration device 22 comprises a measurement space 30 having the reference features 29 and at least one image recording camera 9 for determining the 3D coordinates of the reference features 29. The at least one image recording camera 9 is positioned above the measurement space 30; thus enabling substantially all of the reference features 29 to be recorded. The measurement space 30 is bounded by a U-shaped measurement frame 22, which consists of four flat plates 24, 26, 27, 28 that are connected to each other on their edges. The plates 24, 26, 27, 28 form the U-shaped measurement frame 22, which has the reference features 29 facing towards the measurement space 30. The plates 24, 26, 27, 28 can be connected to one another by plug or screw connections. The reference features 29 are arranged on the surface of said plates 24, 26, 27, 28. Two plates 24, 26 are disposed approximately parallel to one another, wherein the two surfaces, on which the reference features 29 are located, face one another. By way of example, two further plates 27, 28 form a bottom area and are connected to one another so as to be juxtaposed in the same plane.

Instead of the four flat plates 24, 26, 27, 28, the measurement frame 22 can also be composed of three plates, wherein the two plates 27, 28 form a single surface. The measurement frame can alternatively be composed of more than four plates, wherein the four plates 24, 26, 27, 28 are fragmented into further partial plates.

The reference features 29 can be depicted as 2D surfaces or 3D objects having a known geometry, such as a circle, a triangle, a square, a sphere, a cube, a cuboid or something similar, which contrast well the surroundings thereof if need be while utilizing special lighting conditions. They can be embodied as artificial, preferably retro-reflective features. Reference features 29 embodied in this manner have the advantage of being especially simple to detect in a recorded image and of a high degree of measuring accuracy being achievable as a result of the known geometry of said features. A coding can be associated with the reference features 29 in order to simplify the identification thereof.

Available, natural features can also in any case be used as reference features 29, e.g. edges or random contrast patterns, which arise from a texture of the frame. A combination of natural and artificial reference features 29 is likewise possible.

In addition, geometric items of information about the reference features 29 can be known and taken as a basis in the analysis unit 13, as e.g. the distance between reference features 29 or the coordinates of the reference features 29 in a local 2D or 3D coordinate system of at least a part of the measurement frame 22. If available, said items of information are introduced during the computational evaluation by the analysis unit 13, in particular into an adjustment process having corresponding tolerances.

In order to calibrate the measurement system, the 3D coordinates of the reference features 29 of the measurement frame 22 are determined in a first step by the at least one image recording camera 9. The image recording camera 9 comprising an extensive image sensor can be one of the measurement cameras 31, 32 or one of the referencing cameras 34 of the image recording apparatus 12 or an additional camera which does not belong to the measurement system and is used only for determining the 3D coordinates of the reference features 29. Two image recording cameras 9, e.g. two measurement cameras 31, 32, of the image recording apparatus 12 can be used simultaneously for image recording. The image recording camera 9 is connected to the analysis unit 13.

The measurement frame 22 is expediently set up in a fixed manner for the duration of the determination of the 3D coordinates of the reference features 29. Said frame is placed such that reference features 29 of the measurement frame 22 can be recorded from at least two perspectives. The plates 24, 26, 27, 28 and thereby the reference features 29 may not be moved until all perspectives, which are necessary or are to be set, have been recorded and the subsequent calibration has been carried out.

In order to determine the 3D coordinates of the reference features 29 of the measurement frame 22, all reference features 29 have to be recorded by the image recording camera 9 from at least two different image recording positions. The acquisition of the reference features 29 takes place sequentially, wherein a sequence of images of the reference features 29 from one end to the other end of the measurement frame 22 is expediently acquired by changing the image recording direction while keeping the image recording position fixed. The recorded images must overlap and have at least four common reference features 29. After the recording of all the necessary images is completed from one image recording position, the image recording position of the image recording camera 9 is changed, and all reference features 29 of the measurement frame 22 are once again sequentially recorded.

The use of an auxiliary adapter for holding and aligning the image recording camera 9 can be advantageous. The auxiliary adapter specifies a predefined image recording position and image recording direction to the image recording camera 9, whereby a level of accuracy largely independent of the operator is ensured.

The image acquisition can take place continuously. The image data resulting thereby are either completely evaluated or reduced by the analysis unit 13 to the quantity necessary to ensure the required accuracy.

The operator can be supported in the image acquisition. The current image recording position and image recording direction can be displayed online on a monitor, which is connected to the analysis unit 13, said position and direction being calculated from the evaluation of the visible reference features 29 on the measurement frame 22. The operating person can thus very easily bring the image recording camera 9 to the next required image recording position and image recording direction, and the analysis unit 13 can require the number of images and overlapping thereof necessary to ensure the required accuracy. An interactive operator guidance and monitoring with regard to the correct use of the at least one auxiliary adapter can also be executed by the analysis unit 13.

The evaluation of the images takes place according to a statistical adjustment method because the unknowns are presented with a plurality of observations, which result from the network of the image acquisitions. The positions of the reference features 29 in the images form together with the image recording positions and the image recording directions of the image recording camera 9 the unknowns in an equation system, said unknowns being determined by an over-determined system using an adjustment process.

After determining the wanted 3D coordinates of the reference features 29, said coordinates can be checked for plausibility, as, e.g. completeness and separation distance. The achieved accuracy of the 3D coordinates in the form of standard deviations from the analysis of the over-determined system can also be used for the plausibility check. Only if all of the criteria have been positively checked are the 3D coordinates of the reference features 29 used for the calibration of the measurement cameras 31, 32 or the image recording apparatus 12 or the referencing device 33. As a result, the correctness and accuracy of the calibration is ensured even in the case of usage by a non-specialist.

Figure 3:
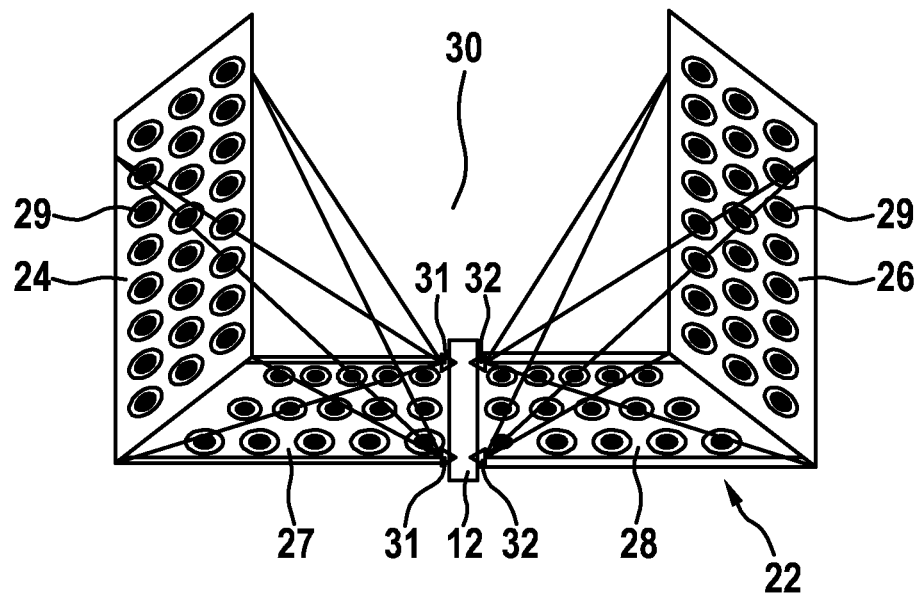
FIG. 3 shows a depiction of a calibration device having an image recording apparatus placed therein and FIG. 4 shows a schematic depiction of a calibration device having two image recording devices placed therein.

After the 3D coordinates of the reference features have been determined in the first step, at least one image recording apparatus 12 is disposed in the measurement space 30 in the second step. An exemplary embodiment is shown in FIG. 3, in which an image recording apparatus 12 is positioned in the center of the base area, which is formed by the plates 27 and 28. In addition, the four measurement cameras 31, 32 are aligned such that in each case a stereo camera system brings one of the two oppositely disposed plates 24, 26 with the reference features thereof into focus.

In the third step, the calibration of the at least one image recording apparatus 12 disposed in the measurement space 30 or the calibration of the at least two measurement cameras 31, 32 of the image recording apparatus 12 is performed. Because all of the 3D coordinates of the reference features 29 of the measurement frame 22 are known, a determination of the 3D coordinates of the measurement cameras 31, 32 in a common 3D coordinate system is possible using known methods of image processing. A relative as well as a global calibration of the individual measurement cameras 31, 32 of the image recording apparatus 12 can be performed.

In the case of a relative calibration, the correlation between the two 3D camera coordinate systems of two measurement cameras 31, 32 as, e.g., in a stereo camera system is established. In the case of a global calibration, the outer orientation of the measurement cameras 31, 32 is defined in the common global 3D coordinate system of the measurement system, which also comprises the referencing devices 33.

In the event of a replacement of measurement cameras 31, 32 of the image recording apparatus 12 taking place prior to the calibration, at least one measurement camera 31, 32 of the image recording apparatus 12 must remain unchanged in order to establish the relationship to the common global 3D coordinate system and to numerically transfer said relationship to the replaced measurement cameras 31, 32. If all of the measurement cameras 31, 32 have to be replaced, the calibration can also take place sequentially in a plurality of steps until all of the cameras have been recalibrated.

In addition to the relative and global camera parameters, all or parts of the intrinsic parameters of the measurement cameras 31, 32 can be determined at the same time. The intrinsic camera parameters define the correlation between the 3D camera coordinate system and the 2D sensor coordinate system and are, e.g., the focal distance, lens distortion, pixel scaling and pixel orientation of a camera.

Figure 4:
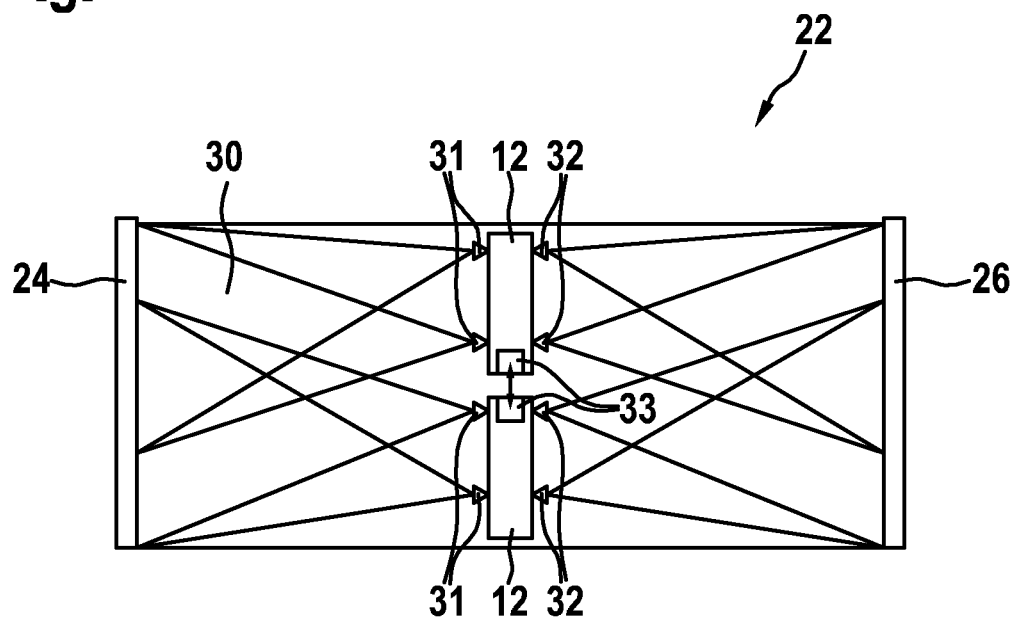

FIG. 4 shows a further embodiment of the invention in which in the second step, two image recording apparatuses 12 are disposed in the measurement space 30 instead of one image recording apparatus 12. The two image recording apparatuses 12 are positioned with respect to one another such that the referencing devices 33 face one another. In addition, the four measurement cameras 31, 32 are aligned in such a way that in each case a stereo camera system brings one of the two oppositely disposed plates 24, 26 of the measurement frame 22 with the reference features thereof 29 into focus. By the positioning of two image recording apparatuses in the measurement frame 22, it is possible to also perform a calibration of the referencing devices 33 in addition to the calibration of the measurement cameras 31, 32. The calibration of the referencing device 33 can be carried out after a replacement of the referencing camera 34 or to check the measurement system. In so doing, a measurement and a comparison of the mutual orientation of the referencing devices 33 occurs in addition to the acquisition of the reference features 29 by the measurement cameras 31, 32. This occurs by the orientation of the LED 35 of the image recording apparatus 12, which is at the top of FIG. 4, being determined in relation to the measurement cameras 31, 32 by the oppositely disposed referencing camera 34 of the image recording apparatus 12, which is at the bottom of FIG. 4, and said orientation being internally stored. The orientation of the LED 35 of the image recording apparatus 12, which is at the bottom of FIG. 4, can alternatively be determined in relation to the measurement cameras 31, 32 by the oppositely disposed reference camera 34 of the image recording apparatus 12, which is at the top of FIG. 4, and can be internally stored.

The invention claimed is:

1. A method for calibrating a measurement system, the measurement system including
   at least one image recording apparatus having at least two measurement cameras that form a stereo camera system, and
   an analysis unit configured to receive stereo image data from the at least one image recording apparatus and generate measurement data regarding a vehicle,
   the method comprising:
   using an image recording camera of a calibration device to determine 3D coordinates of a plurality of reference features positioned in a measurement space of the calibration device;
   positioning the at least one image recording apparatus in the measurement space of the calibration device;
   capturing stereo image data through the at least one image recording apparatus of the measurement system, the stereo image data including image data of the plurality of reference features positioned in the measurement space of the calibration device; and
   processing the stereo image data to determine 3D coordinates of the at least one image recording apparatus in a common 3D coordinate system with the determined 3D coordinates of the plurality of reference features based at least in part on the determined 3D coordinates of the plurality of reference features of the calibration device.

2. The method according to claim 1, further comprising determining one or more intrinsic parameters of at least one of the measurement cameras of the measurement system based on the stereo image data captured during the calibration.

3. The method according to claim 1, further comprising capturing image data using the image recording camera of the calibration device, the image data including image data of the plurality of reference features of the calibration device, by sequentially or continuously acquiring the image data from at least two recording positions by changing recording direction of the image recording camera of the calibration device in the measurement space of the calibration device.

4. The method according to claim 3, wherein acquiring the image data from the at least two recording positions by changing the recording direction of the image recording camera includes performing sequential or continuous image recording of the reference features of the calibration device as the image recording camera is moved between multiple predefined positions by a positioning device.

5. The method according to claim 1, further comprising:
   replacing one measurement camera of the at least two measurement cameras of the at least one image recording apparatus of the measurement system with a new measurement camera; and
   maintaining a global calibration of the at least one image recording apparatus of the measurement system by calibrating the new measurement camera based on image data captured by an unreplaced camera of the at least two measurement cameras of the image recording apparatus of the measurement system and a previous calibration of the at least one image recording apparatus of the measurement system.

6. The method according to claim 1, wherein the measurement system includes two image recording apparatuses, wherein each image recording apparatus includes a referencing device, which places the two image recording apparatuses of the measurement system in relation to one another, the method further comprising:
   positioning the two image recording apparatuses in the measurement space of the calibration device such that the referencing devices face one another; and
   calibrating the referencing devices of the two image recording apparatuses of the measurement system based at least in part on the determined 3D coordinates of the plurality of reference features of the calibration device.

7. The method according to claim 1, wherein the calibrated measurement system includes an axle alignment device.

8. A calibration device for calibrating a measurement system, the measurement system including
   at least one image recording apparatus having at least two measurement cameras that form a stereo camera system, and
   an analysis unit configured to receive stereo image data from the at least one image recording apparatus and generate measurement data regarding a vehicle,
   the calibration device comprising:
   a measurement space for receiving the image recording apparatus is provided and at least partially bounded by a measurement frame having a plurality of reference features; and
   an image recording camera configured to capture image data including the reference features,
   wherein the calibration device is configured to determine 3D coordinates of the plurality of reference features and transmit the determined 3D coordinates to the measurement system, and
   wherein the measurement frame is sized to receive the at least one image recording apparatus of the measurement system, and
   wherein the calibration device is configured to determine 3D coordinates of the at least one image recording apparatus of the measurement system in a common 3D coordinate system with the determined 3D coordinates of the plurality of reference features based on stereo image data captured by the at least one image recording apparatus of the measurement system and the determined 3D coordinates of the plurality of reference features.

9. The calibration device according to claim 8, wherein the measurement frame has at least three plates, which are rigidly connected to one another and are disposed in different planes with respect to one another.

10. The calibration device according to claim 9, wherein at least one plate is substantially perpendicular with respect to two plates disposed oppositely to one another.

11. The calibration device according to claim 9, wherein the reference features on each plate are natural and/or artificial marks.

12. The calibration device according to claim 11, wherein the reference features are retro-reflective and/or actively luminous.

13. The calibration device according to claim 11, wherein the reference features have a coding.

\* \* \* \* \*